Patented June 12, 1945

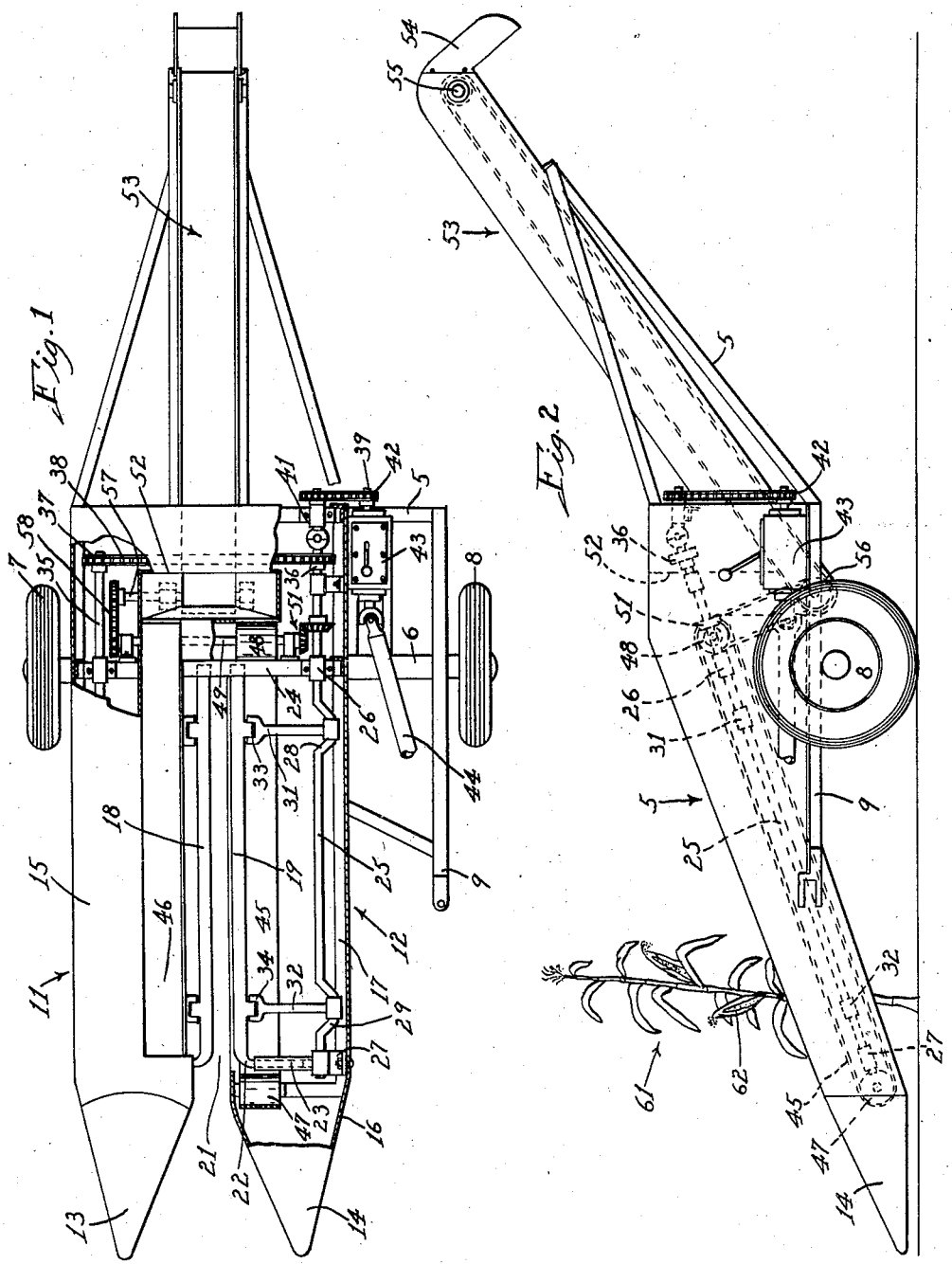

2,378,286

UNITED STATES PATENT OFFICE 2,378,286

CORN HARVESTER

Harold H. Cook, Steward, Ill.

Application August 30, 1943, Serial No. 500,505

4 Claims. (Cl. 56—103)

This invention relates to corn harvesting machines and has special reference to machines designed particularly for the harvesting of sweet corn or the like.

A serious problem in the harvesting of corn is the damage to the ears occasioned by the harvesting operation as heretofore conducted with conventional types of machines in which the stalks of standing corn pass between rotating rolls which move upward along the stalks and squeeze the ears off by contact with the butts of the ears. When the corn being harvested is ripe corn, the kernels of corn are hard and relatively easily shelled, and this squeezing action tends to shell kernels from the butts of the ears, the kernels dropping onto the ground and thus being lost. With sweet corn, which is harvested in a state in which the kernels are soft or in the so-called milk stage, the squeezing of the butts damages the kernels adjacent the butts which introduces difficulties in the canning operation.

An important object of the invention is the provision of a machine for harvesting corn wherein the ears are removed from the stalks without direct contact of any instrument therewith and by reciprocation or movement of the stalk adjacent the ears, the reciprocation being of such sharpness that the ears snap from the stalk due to their inertia.

I have also aimed to provide a corn harvester having spaced picker elements passing along opposite sides of a row of standing corn together with means for reciprocating the elements in synchronism in a movement approaching a straight line movement crosswise of the corn row, the picker elements being inclined upwardly and backwardly so as to engage the stalks adjacent the ground and progress upwardly therealong as the picker moves forward along the corn row whereby the ears are snapped from the stalks at or adjacent the shanks before the picker elements reach an elevation to strike the ears, the ears being removed from a point above the picker elements and falling to the sides of the picker elements to be gathered by conveyers to a central point.

Other objects and advantages will appear from the description and drawing, in which—

Figure 1 is a top view of a corn harvester embodying my invention; and

Fig. 2 is a side view thereof.

The construction herein described and claimed is one species of the generic invention disclosed and claimed in my copending application Serial No. 389,493, filed April 21, 1941, now Patent No. 2,346,252, entitled "Corn picker." In that application I describe the principle of reciprocating and striking the stalk of corn for the purpose of snapping the ears therefrom, and further describe a specific embodiment of the invention employing eccentric rotating rolls for the purpose of alternately striking opposite sides of the stalk. The present invention is directed to a species of the invention in which the picker elements are moved by reciprocation to give a movement approaching a straight line movement as distinguished from the rotary movement disclosed in said copending application.

Directing attention to the drawing, the numeral 5 designates generally a frame structure having an axle 6 upon which wheels 7 and 8 are disposed for the purpose of supporting the machine in its movement through the field, the machine being adapted to be moved along the corn row in conducting the harvesting operations. In this particular instance the machine is constructed for use with a tractor and has a conventional tractor drawbar 9 for attachment to the tractor, the drawbar forming a part of the frame structure. The harvester has two gathering members indicated generally by the numerals 11 and 12, each of which has conventional gathering points 13 and 14 and gathering sheets 15 and 16, the gathering members being supported on arms 17 of the frame structure. Positioned on the gathering members for reciprocation with respect thereto are picker elements 18 and 19, in this instance comprising bars arranged in spaced relation on the inner side of the gathering members providing a space therebetween as indicated at 21 for the reception of the corn row, it being understood that the gathering members straddle the corn row as in conventional corn harvesting devices.

The picker elements 18 and 19 are adapted for reciprocation transversely of the corn row, and for this purpose the front end of each picker element is provided with a guide 22 seating in a tube 23 in which it is free to move longitudinally, the tube 23 being attached to the frame element 17. The rear ends of the bars are supported for guiding movement in the groove of a channel iron member 24 of U-shaped cross-section which serves as a guide for the rear ends of the bars. The bars are reciprocated by means of a crank mechanism including a crank shaft 25 having bearing support on the frame as indicated at 26 and 27 and having cranks 28 and 29 upon which are disposed connecting rods 31 and 32 which are in turn pivotally connected to the bar 19 through conventional yokes and wrist pins as indicated at 33 and 34. The bar 18 is arranged to be driven in like fashion from a crank shaft 35 disposed in the gathering member 15. The crank shafts 25 and 35 carry sprockets 36 and 37 which are interconnected by a chain 38, the two shafts being so arranged that the cranks thereon are disposed in the same direction, or in other words so that both of the bars 18 and 19 simultaneously move either upwardly or downwardly facing Figure 1 so as to alternately strike the row of corn on opposite sides thereof. The crank shafts are driven from a chain 39 trained over a sprocket 41 on the crank shaft 25 and over a sprocket 42 on the shaft of a selective speed transmission indicated generally by the numeral 43. In this instance the transmission 43 is driven from a power take-off shaft 44 of the tractor, but it will be obvious that this may be replaced by any conventional self-contained power unit if desired in order to drive the shafts through the selective speed transmission.

The gathering members also have belts 45 and 46 arranged to extend longitudinally thereof behind the picker elements 18 and 19, both belts being arranged as shown in Figure 1 and being trained over a pulley 47 supported on the frame element 17 adjacent the gathering point, the pulley 47 being of such width that the upper reach of the belt extends above the connecting rods 31 and 32 so that the ears snapped from the stalks can drop behind the snapping elements and onto these belts. The opposite ends of the belts are trained over pulleys 48 carried on a shaft 49 having bearing support on the frame, this shaft being driven by beveled gears 51, in this instance from the crank shaft 25, though obviously this may be driven independent of the change speed transmission 43 if desired, the present arrangement being simply for convenience sake. Thus the ears are transported rearwardly by the belts 45 and 46 and drop off the ends of these belts into the hopper 52 which converges at the lower end of a further conveyer 53 which extends rearwardly and backwardly from the machine, terminating in a chute 54 in such wise that the ears dropping into the chute are carried upward by the conveyer 53 and disposed into a trailing wagon in a manner common in such devices. The conveyer 53 in this instance consists of a conveyer belt trained over pulleys 55 and 56 carried on a shaft 57 which is driven by suitable sprockets and by a chain 58 from the shaft 49.

In use the machine is towed through the field of standing corn with the gathering members 11 and 12 disposed on opposite sides of the corn row and the stalks of standing corn passing into the space 21 between the picker elements 18 and 19. It will be seen that these picker elements are inclined after the same fashion of conventional picker rolls so that the stalk is first received between the bars at a point adjacent the ground as shown in Fig. 2 in which the numeral 61 indicates one stalk of a row of standing corn. As the machine moves forward the picker elements alternately strike opposite sides of the stalk imparting a reciprocation to the stalk and this striking motion progressively advances up the stalk. As the bars approach the ear such as indicated at 62, the severity of the action increases until the weight of the ear of corn prevents the ear from following the movement of the stalk because of the inertia thereof and the ear breaks from the stalk. If the reciprocation is not sufficient, then the upward movement progresses until the stalk is struck at the shank adjacent the butt of the ear and the snapping action reaches its point of greatest severity. When the lowermost ear drops off it falls onto one of the conveyers and is conveyed backwardly into the hopper 52, and simultaneously the picker elements progress upwardly until the next ear is snapped. It will be seen that this action is such that the ears are never directly struck by the picker elements with the exception of the possibility of very small ears which are light in weight. Such small ears may pass completely through the machine without being removed, and in the case of harvesting of sweet corn this is an advantage in that it removes these small undesirable ears from the pick.

The selective speed transmission 43 is provided for the purpose of regulating this severity of action, and this becomes necessary due to variations in the condition of the corn with change in its maturity and with change in the conditions at the time of picking, it being understood that at certain hours of the day when the stalks and shanks tend to dry out, a more severe action is required for the removal of the ears than during the early morning hours when the dew is on the corn and the stalks and shanks are filled with moisture.

As will be seen from Fig. 2, the picker elements are inclined at an angle with respect to the ground so that the forward ends pass on opposite side of the corn stalk adjacent the ground, the picker elements moving upward with respect to the stalk as the harvester moves forward along the corn row. Under these circumstances the shaking or striking action of the picker bars moves progressively up the stalk so that the lowermost ears are first removed and the ears are progressively removed up the stalk, snapping from the stalk before the picker bars reach the elevation of the butt. In most instances the ear is snapped off when the picker elements reach the elevation of the shank, the elements striking the shank just below the ear, to impart the most severe snapping action. In this way the ears are never struck by the picker elements but snap off at the butt and drop back of the picker elements onto the conveyers. It will also be seen that this linear movement of the picker elements avoids the possible complication of interference from the leaves or stalks such as may occur in rotary elements in which the stalks and leaves may tend to wind on the rolls.

I claim:

1. The combination in a wheeled corn harvester of longitudinally disposed spaced members movable along opposite sides of a corn row spaced picker elements comprising bars extending longitudinally of the spaced members and inclined upwardly from front to rear in the direction of travel along the corn row, means for supporting said bars in substantially coextensive spaced relationship for the reception of a corn row therebetween, and means for reciprocating said bars crosswise of the corn row in synchronized substantially straight line movement to strike the stalks of corn in said row through a small portion of their length below the ears alternately on opposite sides thereof to snap the ears therefrom at the shank in response to the impact of said bars.

2. The combination in a wheeled corn harvester of longitudinally disposed spaced gathering members movable along opposite sides of a corn row, spaced picker elements comprising spaced bars extending longitudinally of the spaced gathering members and inclined upwardly from front to rear in the direction of travel along the corn row, means for supporting said bars on said members in spaced relationship for passage on opposite sides of a row of standing corn and for movement of said bars toward and away from the corn row, and means for driving said bars and synchronizing the same for simultaneous movement of one of the bars toward the corn row and the other bar away from the corn row in alternate movements and in substantially straight line movement to strike the stalks of corn below the ears thereon alternately on opposite sides thereof to snap the ears therefrom at the shank.

3. The combination in a wheeled corn harvester of longitudinally disposed spaced gathering members movable along opposite sides of a corn row, spaced picker elements comprising spaced bars extending longitudinally of the corn row, means for supporting said bars longitudinally on said gathering members in spaced backwardly and upwardly inclined relationship for passage on opposite sides of a row of standing corn, said means also supporting said bars for movement thereof generally transversely with respect to said gathering members and thereby toward and away from the corn row, and means for driving said bars and synchronizing the same for simultaneous movement of one of the bars laterally of the gathering members in one direction and thereby toward the corn row and the other bar away laterally of the gathering members in the other direction and thereby from the corn row in alternate movements and in substantially straight line movement while the harvester moves along the corn row to strike the stalks of corn below the ears alternately on opposite sides thereof in rapid succession and progressively upward along the corn stalk to snap the ears therefrom at the shank by impact below the ears.

4. The combination in a wheeled corn harvester of longitudinally disposed spaced gathering members movable along opposite sides of a corn row, picker elements on said gathering members comprising bars extending longitudinally of the corn row and inclined upwardly from front to rear in the direction of travel along the corn row and spaced for passage on opposite sides of a row of standing corn, means at opposite ends of said bars for supporting and guiding the same for movement thereof laterally with respect to the gathering members and thereby linearly toward and away from the corn row, a plurality of connecting rods connected to said bars, and cranks carrying said connecting rods rotatable to move said bars, means for driving said cranks in synchronism for simultaneous movement of one of said bars toward the corn row and the other bar away from the corn row in alternate movements and in substantially straight line movement to strike the stalks of standing corn alternately on opposite sides thereof in rapid succession beginning near the ground as the stalks enter between the bars and progressing upwardly along the stalks as the harvester moves along the corn row to snap the ears therefrom by impact prior to engagement of the bars with the ears, and means for changing the speed of said driving means to select any of a plurality of speeds for said bars dependent upon the condition of the corn.

HAROLD H. COOK.